United States Patent
Van Dyk et al.

(10) Patent No.: US 10,273,314 B2
(45) Date of Patent: Apr. 30, 2019

(54) SET-LRP POLYMERIZATION OF ACRYLATES IN THE PRESENCE OF ACIDS

(75) Inventors: Antony K. Van Dyk, Blue Bell, PA (US); Susan J. Fitzwater, Ambler, PA (US); Sven Fleischmann, Ludwigshafen (DE); Virgil Percec, Philadelphia, PA (US)

(73) Assignees: ROHM AND HAAS COMPANY, Philadelphia, PA (US); THE TRUSTEES OF THE UNIVERSITY OF PENNSYLVANIA, Philadelphia, PA (US)

(*) Notice: Subject to any disclaimer, the term of this patent is extended or adjusted under 35 U.S.C. 154(b) by 148 days.

(21) Appl. No.: 13/811,820

(22) PCT Filed: Jul. 22, 2011

(86) PCT No.: PCT/US2011/044992
§ 371 (c)(1),
(2), (4) Date: May 24, 2013

(87) PCT Pub. No.: WO2012/012705
PCT Pub. Date: Jan. 26, 2012

(65) Prior Publication Data
US 2013/0245216 A1    Sep. 19, 2013

Related U.S. Application Data

(60) Provisional application No. 61/367,284, filed on Jul. 23, 2010.

(51) Int. Cl.
*C08F 2/06* (2006.01)
*C08F 4/10* (2006.01)
(Continued)

(52) U.S. Cl.
CPC ............ *C08F 2/06* (2013.01); *C08F 4/10* (2013.01); *C08F 4/40* (2013.01); *C08F 20/14* (2013.01);
(Continued)

(58) Field of Classification Search
CPC ............ C08F 2438/00; C08F 2438/01; C08F 2438/02; C08F 2438/03; C08F 2/06; C08F 4/10
(Continued)

(56) References Cited

U.S. PATENT DOCUMENTS 7,332,550 B2    2/2008    Matyjaszewski et al.
7,470,762 B2    12/2008   Percec et al.
(Continued)

FOREIGN PATENT DOCUMENTS

CN    101735362 A    6/2010
WO    2006080928 A1    8/2006
(Continued)

OTHER PUBLICATIONS

Fleischmann, S., et al., "Set-LRP of MMA in Acetic Acid", Sep. 10, 2010, pp. 4889-4893, J. Polym. Sci. A Polym. Chem., 48.
(Continued)

*Primary Examiner* — Bijan Ahvazi
*Assistant Examiner* — David L Miller
(74) *Attorney, Agent, or Firm* — Cantor Colburn LLP

(57) ABSTRACT

SET-LRP polymerization of acrylic monomers under acidic conditions is described. The source of the acidity may be the solvent (e.g., an acetic acid-containing solvent) or in the monomer content (e.g., acrylic acid or methacrylic acid, optionally in combination with other monomers such as methyl methacrylate).

5 Claims, 12 Drawing Sheets

Figure 1A:
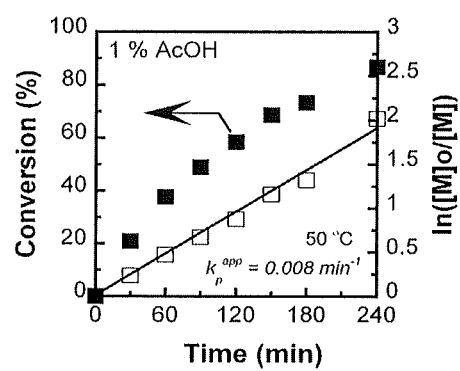
Figure 1B:
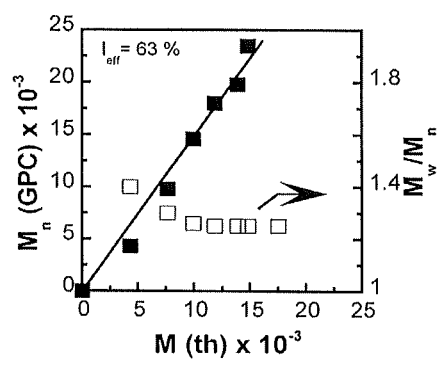
Figure 2A:
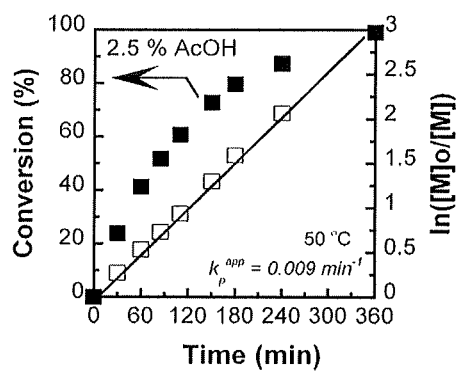
Figure 2B:
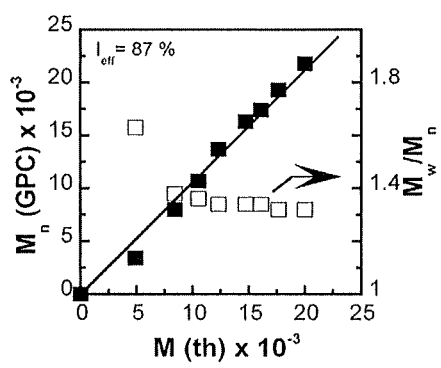

(51) Int. Cl.
  *C08F 20/14* (2006.01)
  *C08F 120/14* (2006.01)
  *C08F 4/40* (2006.01)
  *C08F 220/14* (2006.01)

(52) U.S. Cl.
  CPC .......... *C08F 120/14* (2013.01); *C08F 220/14* (2013.01); *C08F 2438/00* (2013.01); *C08F 2438/01* (2013.01); *C08F 2438/02* (2013.01); *C08F 2438/03* (2013.01)

(58) Field of Classification Search
  USPC .............................. 526/108, 119, 191, 317.1
  See application file for complete search history.

(56) References Cited

U.S. PATENT DOCUMENTS

| | | |
|---|---|---|
| 2003/0216528 A1 | 11/2003 | Matyjaszewski et al. |
| 2006/0188577 A1 | 8/2006 | Kimura et al. |
| 2006/0210929 A1* | 9/2006 | Yamada ........................ 430/311 |
| 2006/0258826 A1 | 11/2006 | Matyjaszewski et al. |

FOREIGN PATENT DOCUMENTS

| | | |
|---|---|---|
| WO | WO2008019100 A2 | 2/2008 |
| WO | 2009155203 A2 | 12/2009 |
| WO | WO 2009155303 A2 * | 12/2009 |

OTHER PUBLICATIONS

Fleischmann, S., et al., "Copolymerization of Methacrylic Acid with Methyl Methacrylate by SET-LRP", Sep. 7, 2010, pp. 4884-4888, J. Polym. Sci. A Polym. Chem., 48.
Goto, Atsushi, et al., "Reversible Chain Transfer Catalyzed Polymerization (RTCP) with Carbon Catalysts", Institute for Chemical Research, Kyoto University, Uji, Kyoto 611-0011, Japan, 2 pages.
Matyjaszewski, Krzysztof, "Controlled Radical Polymerization: State of the Art in 2008", Center for Macromolecular Engineering, Aug. 13, 2009, pp. 3-13, ASC Symposium Series, American Chemical Society, Washingon, D.C.
Mincheva, Rosica, et al., "Optimized Water-Based ATRP of an Anionic Monomer: Comprehension and Properties Characterization", Dec. 1, 2008, pp. 1108-1119, Journal of Polymer Science, Part A: Polymer Chemistry, vol. 47, Wiley Periodicals, Inc.
Ouchi, Makoto, et al., "Transition Metal-Catalyzed Living Radical Polymerization: Toward Perfection in Catalysis and Precision Polymer Synthesis", Sep. 29, 2009, pp. 4963-5050, Chem. Rev. 2009, 109, Americal Chemical Society.
Rosen, Brad, et al., "Single-Electron Transfer and Singe-Electron Transfer Degenerative Chain Transfer Living Radical Polymerization", Oct. 9, 2009, pp. 5069-5119, Chem. Rev. 2008, 109, American Chemical Society.
International Preliminary Report on Patentability for International Application No. PCT/US2011/044992 dated Jan. 23, 2013, 5 pages.
International Search Report for International Application No. PCT/US2011/044992 dated Dec. 9, 2011, 2 pages.
Written Opinion for International Application No. PCT/US2011/044992 dated Dec. 9, 2011, 4 pages.

McCullough, Lynne A. et al., "Incorporation of Poly(2-acrylamido-2-methyl-N-propanesulfonic acid) Segments into Block and Brush Copolymers by ATRP", Journal of Polymer Science: Part A: Polymer Chemistry, pp. 5386-5396, Jun. 2009, published online in Wiley InterScience (www.interscience.wiley.com).
Tsarevsky, Nicolay V. et al., ""Green" Atom Transfer Radical Polymerization: From Process Design to Preparation of Well-Defined Environmentally Friendly Polymeric Materials", Chemical Reviews, pp. 2270-2299, vol. 107, No. 6, published on Web May 27, 2007, American Chemical Society.
Van Camp, Wim et al., "Atom Transfer Radical Polymerization of 1-Ethoxyethyl (Meth)acrylate: Facile Route toward Near-Monodisperse Poly((meth)acrylic acid)", Macromolecules, pp. 6673-6675, vol. 37, No. 18, published on Web Aug. 12, 2004, American Chemical Society.
Yamamoto, Shin-Ichi et al., "Temperature- and pH-Responsive Dense Copolymer Brushes Prepared by ATRP", Macromolecules, pp. 7013-7020, vol. 41, No. 19, published on Web Sep. 4, 2008, American Chemical Society.
English translation of Office Action regarding related CN Application No. 201180041655.8; dated Aug. 12, 2014; 9 pgs.
Extended Search report regarding related EP Application No. 11810454.6-1301 dated Jul. 10, 2014; 5 pgs.
Office Action regarding related AU Patent App. No. 2011281008, dated Jan. 16, 2015, 3 pgs.
Ashford, E. J., et al., "First example of the atom transfer radical polymerisation of an acidic monomer: direct synthesis of methacrylic acid copolymers in aqueous media," Chem. Commun., 1999; pp. 1285-1286.
Guliashvili, Tamaz and Percec, Virgil, "A Comparative Computational Study of the Homolytic and Heterolytic Bond Dissociation Energies Involved in the Activation Step of ATRP and SET-LRP of Vinyl Monomers," Journal of Polymer Science, vol. 45; 2007; pp. 1607-1618.
Krieg, Andreas, et al., "Dual hydrophilic polymers based on (meth)acrylic acid and poiy(ethylene glycol)—synthesis and water uptake behavior," Polym. Chem., 2010, 1; pp. 1669-1676; www.rsc.org/polymers; retrieved from the web Jul. 21, 2016.
Matyjaszewski, Krzysztof, "Handbook of Radical Polymerization," John Wiley and Sons, Inc., copyright 2002; pp. 531-533.
Mori, Hideharu, et al.; "New polymeric architectures with (meth)acrylic acid segments," Prog. Polym. Sci. 28 (2003); pp. 1403-1439; www.elsevier.com/locate/ppolysci.
Patten, Timothy, et al.; "Atom Transfer Radical Polymerization and the Synthesis of Polymeric Materials," Adv. Mater.; 1998, 10, No. 12; 1998; pp. 901-915.
Percec, Virgil, et al., "Ultrafast Synthesis of Ultrahigh Molar Mass Polymers by Metal-Catalyzed Living Radical Polymerization of Acrylates, Methacrylates, and Vinyl Chloride Mediated by SET at 25° C.," JACS Articles; Published on Web Oct. 5, 2006; 10 pgs.
Treat, Neil, et al., "A Facile Route to Poly(acrylic acid) Brushes Using Atom Trnasfer Radical Polymerization," Macromolecules; vol. 39, No. 1, 2006; pp. 26-29.
Tsarevsky, Nicolay, et al., "Competitive Equilibria in Atom Transfer Radical Polymerization," Macromal. Symp. 2007, 248, pp. 60-70.
Van Camp, Wim, et al., Atom Transfer Radical Polymerization of 1-Ethoxyethyl (Meth)acrylate: Facile Route toward Near-Monodisperse Poly((meth)acrylic acid), Macromolecules 2004; vol. 37, No. 18; pp. 6673-6675.

* cited by examiner

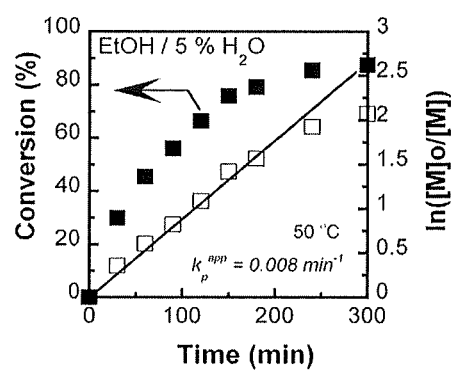 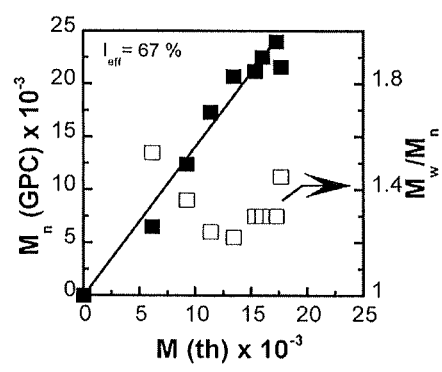
FIG. 5A                    FIG. 5B

SET-LRP POLYMERIZATION OF ACRYLATES IN THE PRESENCE OF ACIDS

STATEMENT OF FEDERAL SUPPORT

This invention was made with government support under DMR0548559 and DMR0520020 awarded by the National Science Foundation. The government has certain rights in the invention.

Living radical polymerization ("LRP"), also commonly referred to as controlled radical polymerization ("CRP"), has been reported in one form or another for some time. Unlike LRP, conventional free radical polymerization often proceeded at a relatively uncontrolled rate until the occurrence of a chain-terminating reaction or exhaustion of monomer reactant. Average molecular weight could be generally controlled by controlling a quantity of chain-terminating reactants; however, due to the difficulty of controlling precisely when the chain-terminating reaction might occur on any individual macroradical chain, conventional free radical polymerization could result in a wide range of polymer chain lengths in the population of polymer molecules, resulting in a highly polydisperse polymer. LRP occurs when the side reactions that lead to termination of the polymer chain are eliminated or significantly reduced, and the degree of polymerization is manipulated by controlling the equilibrium of a reversible transformation of the living polymer chain between an active form macroradical that will propagate chain growth and an inactive or dormant macromolecule that cannot propagate chain growth unless it is converted into the active macroradical form. LRP is thus able to produce polymers through free radical chain extension where molecular weight is readily controlled and with improved lower polydispersities.

A number of different LRP schemes have been developed, including but not limited to nitroxide-mediated LRP ("NMP"), organobismuthine-mediated LRP ("BIRP"), atom-transfer radical polymerization ("ATRP"), single electron transfer degenerative chain transfer mediated LRP ("SET-DTLRP"), and single electron transfer LRP ("SET-LRP"). SET-LRP schemes typically utilize copper as an activator to catalyze the formation of an active macroradical in the reversible reaction:

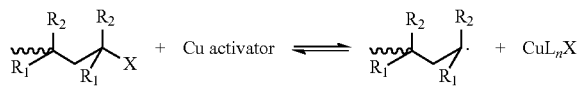

where X is a halogen, $L_n$ is a ligand-forming moiety, and $R_1$ and $R_2$ are conventional radicals (for example, in the case of acrylic polymers, $R_1$ may be H or $CH_3$, and $R_2$ may be carboxyl, and carboxylate).

It has been reported in the literature that acidity can negatively affect the above-described activation reaction by protonating the ligand-forming moiety, thereby disrupting the formation of $CuL_nX$ and driving the equilibrium of the reaction toward formation of the inactive macromolecule:

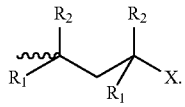

See, for example, U.S. Pat. No. 7,332,550, and Tsarevsky, N. V. & Matyjaszewski, K., *Chem. Rev.* 2007, 107, 2270-99. This has led to the avoidance of acidic solvents for conducting LRP reactions as well as protection or neutralization of the carboxyl group on acrylic acid and methacrylic acid monomers. However, water-soluble salts of acrylic acid and methacrylic acid have been difficult to polymerize with LRP techniques, which is believed may be caused by formation of complexes between the anionic carboxyl groups on the monomer with the metal catalyst, again disrupting the formation of $CuL_nX$ and driving the equilibrium of the reaction toward formation of the inactive macromolecule.

U.S. Pat. No. 7,332,550 reports ATRP polymerization of methacrylic acid-containing acrylic monomer mixtures by using a tetradentate ligand-forming entity ethyl-1,2-dithiodiacrylic acid ("EDTDAA") in its Na salt form. The '550 patent also reports that ATRP polymerization does not work when EDTDAA in its acid form is added directly to the reaction mixture. Thioethers are considerably more reactive than their corresponding ethers and reaction conditions involving elevated temperatures, various copper species, radicals and vinyl groups, may lead to the formation of additional thio species with unanticipated consequences on the LRP reaction. Thioethers, and thio compounds in general, are frequently associated with odor and low odor threshold. Polymerization with dithiocarbamate and other RAFT agent species (which can be produced by ATRP from various disulfide precursors, *Macromolecules* 2009, 42, 3738-3742), is notorious for the incidental production of malodorous compounds. Consequently it is desirable to avoid dithioether ligands.

Accordingly, there is a need for LRP techniques that are effective in the presence of acidity without the need to resort to thiol ligand compounds.

According to exemplary embodiments of the present invention, it has been discovered that SET-LRP polymerization of acrylic monomers is unexpectedly able to tolerate acidic conditions. The source of the acidity may be the solvent (e.g., an acetic acid-containing solvent) or in the monomer content (e.g., acrylic acid or methacrylic acid, optionally in combination with other monomers such as methyl methacrylate). Thus, in an exemplary embodiment of the invention, there is provided polymeric composition, comprising an acrylic polymer or copolymer derived from a single electron transfer living radical polymerization of a reaction mixture comprising:

(a) one or more acrylic monomers, including a monomer of the formula:

wherein $R_1$ is hydrogen or $C_{1-3}$ alkyl and $R_2$ is carboxyl or carboxylate;
(b) a metal single-electron transfer catalyst;
(c) a component comprising a solvent and optional sulfide-free ligand, where said component or combination of component and monomer is capable of disproportionating the metal single-electron transfer catalyst; and
(d) an organohalide initiator;
with the proviso that $R_2$ is carboxyl, or the solvent includes a compound comprising a carboxyl group, or that $R_2$ is carboxyl and the solvent includes a compound comprising a carboxyl group.

Techniques for performing SET-LRP polymerization of acrylic monomers are disclosed in Attachments A and B hereto, in B. Rosen and V. Percec, "Single-Electron Transfer and Single-Electron Transfer Degenerative Chain Transfer Living Radical Polymerization", *Chem. Rev.* 109, 5069-5119 (2009), and in WO 2008/019100 A2, the disclosure of each of which is incorporated herein by reference in its entirety.

The monomers to be polymerized in accordance with exemplary embodiments of the invention include at least one acrylic monomer according to the formula

wherein $R_1$ is hydrogen or $C_{1-3}$ and $R_2$ is carboxyl or carboxylate. In one exemplary embodiment, $R_1$ is hydrogen. Examples of $R_1$ alkyl groups include methyl, ethyl, and propyl. In one exemplary embodiment, an $R_1$ alkyl group is methyl. Carboxylate groups useful as $R_2$ include, but are not limited to, carboxylate salts that have been neutralized by amine bases such as amines to form salts such as ammonium carboxylate, sodium carboxylate, or potassium carboxylate. Carboxylate groups useful as $R_2$ also include carboxylate esters including but not limited to alkyl (alk)acrylates having 1-12 carbon atoms in the alkyl portion, alkylalkoxy (alk) acrylates having 1-36 carbon atoms in the alkyl portion and 1-100 alkoxy repeats ($C_2$, $C_3$, $C_4$ alkoxy), cycloalkyl (alk) acrylates having $C_{3-8}$ cycloalkyl groups, bicycloalkyl (alk) acrylates having $C_{7-15}$ cycloalkyl groups (e.g., norbornyl, isobornyl), tricycle (alk)acrylates, and combinations thereof. Specific examples of (alk)acrylate ester monomers include, but are not limited to, methyl (meth)acrylate, ethyl (meth) acrylate, butyl (meth)acrylate, 2-hydroxyethyl (meth)acrylate, 2-methoxyethyl (meth)acrylate, poly(ethylene glycol) meth(acrylate), poly(alkoxy) (alk)acrylateand solketal (meth)acrylate.

The reaction mixture may also contain other unsaturated monomers capable of being polymerized by SET-LRP, as is known in the art. Other monomers may include, for example, halogen-substituted alkenes (e.g., vinyl chloride, vinyl fluoride), (meth)acrylamides (e.g., acrylamide), N-vinylpyrrolidone, vinyl acetate, dimethylaminoethyl methacrylate (DMAEMA), Dimethylamino)-propyl methacrylamide (DMAPMA), alpha-dimethyl-m-isopropenyl benzyl isocyanate (TMI) and condensation products with groups such as alcohols, alkylalkoxy groups such as surfactants, dialkyl amines, alkoxy dialkylamines, alkoxy dibenzylamines, styrene, acrylonitrile, vinyl benzyl chloride, divinyl benzene, diallyl phthalate, pentaerythritol tetraacrylate, and ethylene dimethacrylate.

The metal catalyst is an electron donor that produces a disproportionable metal halide in situ via single-electron transfer activation. Copper catalysts have been found to be useful as SET catalysts, forming Cu(I)X in situ via SET activation. Generally, good SET catalysts have a relatively high electron donor activity. Electron donor activity is generally inversely proportional to ionization potential, which can be roughly coordinated with $E_{HOMO}$. Good SET performance has been observed for copper-containing catalysts having an $E_{HOMO}$ of less than 8.8 eV and more particularly less than 8.3 eV. Such catalysts may include $Cu^0$ (e.g., in powder or wire form), and Cu salts such as $Cu_2Te$, $Cu_2Se$, $Cu_2S$, or $Cu_2O$. Unlike ATRP, which requires stoichiometric amounts of catalyst, SET-LRP requires only catalytic amounts of catalyst. That said, it has been demonstrated that SET-LRP catalysts utilize a surface-mediated activation, and the rate of polymerization is proportional to the surface area of catalyst in the reaction mixture. For example, with equal amounts of Cu(0) powder in the reaction mixture, it has been demonstrated that reducing particle size of the powder (and thereby increasing surface area) results in increased rates of polymerization. Although the metal catalyst may be in any physical form, in one exemplary embodiment the catalyst is in wire form, which can provide the benefit of easy removal and recycling after the reaction has occurred as well as easy measurement and control of surface area (e.g., by selecting gauge and length of the wire).

Any of a number of organohalide initiators may be used, and the choice of halogen can vary. In one exemplary embodiment where the monomers include methacrylates, the halogen in the initiator may be Cl. In another exemplary embodiment where the monomers include acrylates and/or vinyl chloride, the halogen in the initiator may be Br or I. Specific examples of organohalide initiators include haloforms such as $CHCl_3$, $CHBr_3$, or $CHI_3$. When $CHCl_3$ is used as an initiator, low levels of $CuCl_2$ may be used to regulate the polymerization. Other exemplary organohalide initiators include α-haloesters such as methyl 2-bromopropionate, methyl 2-chloropropionate (which may utilize low levels of $CuCl_2$, ethyl 2-bromoisobutyrate, 2-bromo-2-methyl propionic acid 4-methoxyphenol ester, bis(2-bromopropionyloxy) ethane ("BPE"), pentaerythritol tetrakis(2-bromopropionoate), α,ω-di(bromo)-polybutyl alcohol (a macroinitiator). Another class of exemplary organohalide initiators include sulfonyl halides such as toluene sulfonyl halide ("TosCl"), phenoxybenzene-4,4'-disulfonyl chloride ("PDSC"), the effectiveness of which may be enhanced by avoiding DMSO as a solvent and/or utilizing multidentate aliphatic N-ligands. Still further exemplary organohalide initiators include 2-bromopropionitrile, benzyl chloride, benzyl poly (N-isopropylacrylamide) ("PNIPAM") as a macroinitiator, N-benzyl-2-bromo-2-methylpropionamide, N-phenyl-2-bromo-2-methylpropionamide, N-chloro-2-pyrrolidinone, and 2-cyanoprop-2-yl-1-dithionaphthalate. Of course, this disclosure is not intended to be limiting, and other organohalide compounds may be used as initiators.

The solvent and optional ligand used in SET-LRP should be selected to favor disproportionation of Cu(I) in to Cu(0) and Cu(II). The reason for this can be better understood by reference to the simplified rendition of the reaction scheme below:

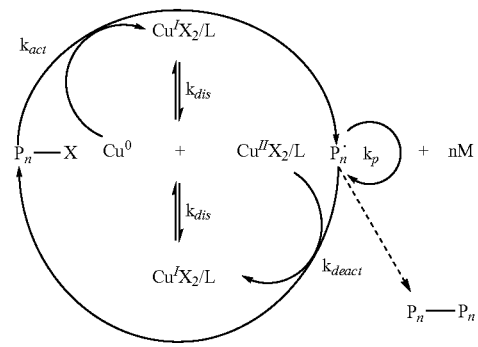

The initiation (activation) step ($k_{act}$) is mediated by a SET from the electron donor (Cu(0) or other species) to the electron acceptor (the initiator). Subsequently, the Cu(I) generated in this step disproportionates into Cu(II) and Cu(0) species. In order for the SET-LRP reaction to proceed, Cu(I)X produced in situ via activation and deactivation process must rapidly disproportionate to Cu(0) and Cu(II)X$_2$ in order to have sufficient amounts of Cu(II)X$_2$ to regulate the rapid polymerization. In one exemplary embodiment, the solvent and optional ligand, or the combination of solvent, optional ligand, and monomer are capable of disproportionating copper in a copper-containing metal catalyst, Cu(I)X, into Cu(0) and Cu(II)X$_2$ where X is Cl, Br, or I.

Rapid disproportionation of Cu(0) is promoted by polar or protic solvents (including multi-protic solvents), including but not limited to water, DMF, methanol, ethanol, DMSO, ethylene glycol, NMP, dimethylacetamide, acetic acid, formic acid, propionic acid, oxalic acid, malonic acid, succinic acid, or carballylic acid, and mixtures thereof. While Cu(I)X will disproportionate readily in water or largely aqueous media, the disproportionation is significantly less pronounced in most organic solvents, even polar or protic solvents. Increasing temperature can enhance the disproportionation of Cu(I)X. The presence of ligands that has also been shown to be a useful tool for shifting the equilibrium constant toward the disproportionation of Cu(0).

Various ligands are known to promote disproportionation of metal salts such as Cu(I)X. In an exemplary embodiment, the ligand comprises N-ligand groups. Useful N-ligand compounds include, but are not limited to tris(2-(dimethylamino)ethyl)-amine (also referred to as "Me6-TREN"), tris (2-aminoethyl)amine ("TREN"), N,N,N',N',N-pentamethyldiethylenetriameine ("PMDETA"), 1,1,4,7,10,10-hexamethyltriethylenetetraamine ("HMETEA"), polyethyleneimine ("PEI"), 2,2'-bipyridine ("bpy"), and N-n-propyl-2-pyridylmethylamine ("Pr-PMI" or "Haddleton's ligand") The choice of monomer can also enhance the disproportionation of the metal catalyst, as 2-hydroxyethyl methacrylate and N,N-dimethylacrylamide have been shown to disproportionate Cu(I)X. Combinations of disproportionation-enhancing techniques may also be used. For example, bpy and Pr-PMI do not appear to disproportionate Cu(I)X in DMSO at room temperature, but have been shown to mediate disproportionation at elevated temperatures.

When present, the amount of ligand may be adjusted to provide the desired level of activity. When too little ligand is present, $k_p^{app}$ may be slow due to diminished surface activation consistent with a Langmuir-Hinshelwood mechanism. Too much ligand can also result in a decreased rate. Generally, the highest levels disprorportionation can be achieved when the amount of ligand present is about half of the molar equivalents of the amount if Cu(I)X in the reaction mixture, although other amounts may provide an optimum combination of polymerization rate and control.

Initiation of electron transfer is required to activate SET-LRP. In its simplest form the activation step of SET-LRP is $D''+R-X \rightarrow R^*+(X^-+D^{n+1})$, where $D''$ is the donor, D, in oxidation state n. A donor, in most cases Cu$^0$ for SET-LRP and Cu$^0$ or SO$_2^{-\bullet}$ in the case of SET-DTLRP, oxidatively transfers an electron to an organic halide R—X, resulting in the rupture of the R—X bond to form organic radical R$^\bullet$ and X$^-$ and D$^{n+1}$. This seemingly straightforward mechanism can actually proceed through three pathways:

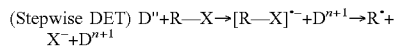

(Stepwise DET) $D''+R-X \rightarrow [R-X]^{-\bullet}+D^{n+1} \rightarrow R^\bullet + X^- + D^{n+1}$

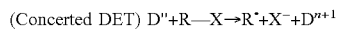

(Concerted DET) $D''+R-X \rightarrow R^\bullet + X^- + D^{n+1}$

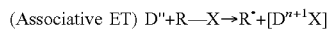

(Associative ET) $D''+R-X \rightarrow R^\bullet + [D^{n+1}X]$

Stepwise dissociative electron-transfer (DET) involves single-electron transfer (SET) from the donor to the organic halide to produce a radical-anion intermediate, which subsequently decomposes to furnish the radical and the halide. Concerted DET involves SET from the donor to the organic halide, mediating direct heterolysis without the intermediacy of a radical anion. Associative electron-transfer (AET) is the abstraction of the halide by the donor without the formation of an ionic intermediate. Except in donor-free reduction via glassy carbon electrodes or through solvated electrons, where AET is not applicable, all three processes are valid and continuum of mixed pathways is also possible if not likely.

In systems containing a homogeneous organic or organometallic donor or a heterogeneous metallic donor, any ET process proceeds through the formation of a 1:1 donor/acceptor encounter or precursor complex. It is the nature of the encounter complex that most broadly distinguishes the fundamental mechanism of electron transfer. Electron transfer between two metal centers via a conduit bridging ligand that belongs to the inner-sphere coordination shell of both the donor and the acceptor as has been described by H. Taube as inner-sphere electron transfer (ISET). Electron-transfer reactions that occur through an encounter complex devoid of a bridging inner-sphere ligand have been termed outer-sphere electron-transfer (OSET).

While the bridged complex in Taube ISET is often only transient, sometimes a bridging interaction leads to a stable mixed-valence complex. The degree of electron transfer in mixed-valence complexes can increase from complete localization (Robin-Day Class I) to complete delocalization (Robin-Day Class III). ISET and OSET terminology can be generalized to include organic and organometallic donors and acceptors through comparison of the donor-acceptor interaction energies $H_{DA}$. ET reactions with small values of $H_{DA}$ can be considered OSET, while larger values correspond to ISET. A formal bridging interaction would constitute a large $H_{DA}$ value, and thus, the two definitions for ISET are consistent. An OSET process with low $H_{DA}$ can be readily modeled via potential surface of the self-exchange reactions of donor and acceptor according to Marcus theory.

The R—X cleavage in SET-LRP and SET-DTLRP can potentially occur via an OSET or an ISET process depending on the degree of interaction between the donor, Cu$^0$ or SO$_2^{-\bullet}$, and the acceptor R—X in the encounter complex. In the weakly or noninteracting extreme, an OSET DET process will occur where the electron from the donor is transferred to σ* R—X orbital. The resulting destabilization leads to stepwise or concerted bond cleavage to R$^\bullet$ and X$^-$. Concerted versus stepwise dissociation is largely determined by the stability of the prospective radical-anion intermediate in the reaction milieu. Stronger interaction between the donor and acceptor molecules can lead to an ISET DET process. Here, the electron transfer to the σ* orbital proceeds through a more intimate complex of donor and acceptor but ultimately results in the heterolytic cleavage and diffusion of R$^\bullet$ and X$^-$. If a bridging halide interaction does occur in accordance with the Taube ISET model, electron transfer can proceed according to AET, where the halide migrates to the donor, forming a complex and R$^\bullet$.

The continuum between OSET and ISET, DET and AET, and concerted and stepwise depends on the structure of the donor, the acceptor, the electronic environment of the reaction medium, and the temperature, and such classification can be ambiguous. Stepwise OSET DET can be modeled readily via the Marcus-Hush two-state theory. Concerted OSET DET requires modification of the original Marcus theory to include simultaneous bond breaking via a repulsive product curve. ISET DET or AET is not readily modeled by a two-state theory, and the entire donor/acceptor complex needs to be considered.

As a point of reference, ATRP has been dubbed a "homolytic" ISET process, where the equilibrium between dormant species P—X and propagating macroradical is mediated by a complex reaction, composed of four elementary contributing reactions:

Cu$^I$X/N-ligand+P—X ↔ Cu$^{II}$X2/N-ligand+P•

Homolysis: R—X→R•+X•

Electron Transfer Cu$^I$X→[CuIIX]$^+$+e$^-$

Reduction: X•+e$^-$→X$^-$

Complexation: [Cu$^{II}$X]$^+$+X$^-$→Cu$^{II}$X$_2$

It has been further suggested that the K$_{ATRP}$, the equilibrium constant of ATRP, is the multiplicative product of the equilibrium constants for all four of these elementary reactions. A series of computational studies were performed on the thermodynamics of homolytic bond dissociation of initiators and dormant species relevant to ATRP. While these studies provided useful trends in homolytic bond dissociation energies and obviously the strength of the R—X bond plays a role activation, it is unlikely that the dissection of the ATRP into these elementary steps has any particular relevance. Even if the bond-breaking process resembles homolysis, the interaction between donor and acceptor needs to be incorporated.

M. J. Monteiro has reported (see *J. Polym. Sci., Part A: Polym. Chem.* 2008, 46, 146) that the complex of CuBr with NH$_2$-capten mediates the radical polymerization of styrene initiated with 1-bromoethylbenzene (1-BEB). NH$_2$-capten is a macrobicyclic ligand, and in its complex with Cu$^{I/II}$, the metal should reside in the center of the ligand cavity. In other metal-caged complexes, due to the limited lability of the coordination sites and the steric demands of the ligand, electron-transfer reactions have been found to be outer-sphere. Similarly, the formation of an inner-sphere encounter complex between CuBr/NH$_2$-capten and the dormant bromo chain ends of styrene is unlikely, and thus any activation it mediates will occur via OSET. CuBr/NH$_2$-capten has been reported to mediate LRP of styrene at 60° C., while CuBr/bpy did not. At 100° C., CuBr/NH$_2$-capten mediated significantly faster radical polymerization than CuBr/bpy. The polymerization was not living as completely encapsulated CuBr/NH$_2$-capten was unable to mediate significant deactivation. CuBr/NH$_2$-capten was then targeted for use as an activator for the multiblock coupling of α,ω-(dibromo)PSty. Despite CuBr/NH$_2$-capten's remarkable rate acceleration, the radical polymerization of styrene, no multiblock coupling was achieved in toluene. However, in DMSO, a solvent that is known to mediate electron transfer, efficient multiblock coupling could be achieved. It is evident that activation with CA$^I$Br need not be ISET and that at least comparable if not higher activation rates can be achieved through an OSET process.

The role of DMSO in accelerating Cu$^I$Br/Pr-PMI mediated LRP has been previously discussed. The enhanced polarity of the solvent was suggested to stabilize charge separation in the transition state and induce greater separation of the cuprous halide catalyst resulting in a potentially more reactive Cu$^+$/L active species. Further, it was recognized that DMSO could complex either Cu$^{II}$, enhancing the activation process, or Cu$^I$, thereby altering its reactivity. In the context of SET-LRP and perhaps ATRP if it does proceed to some extent through an electron-transfer process, the rate of electron transfer, k$_{et}$, can be modeled via the Marcus equation:

$$k_{et} = \frac{2\pi}{h}|H_{AB}|^2 \frac{1}{\sqrt{4\pi\lambda k_b T}} \exp\left(\frac{(-\lambda + \Delta G^0)^2}{4\lambda k_b T}\right) \quad (1)$$

Here H$_{AB}$ is the donor-acceptor coupling constant also referred to as H$_{DA}$, λ is the solvent reorganization energy, h is Planck's constant, k$_b$ is Boltzmann's constant, and T is temperature. λ can be broken down according to λ=λ$_{in}$+λ$_{out}$. Solvation can affect the process in three fundamental ways. First, solvent can affect the outer-sphere reorganization energy λ$_{out}$ as λ$_{out}$≈(1/n$^2$–1/ε$_r$), where n is the index refraction and ε$_r$ is the relative permittivity. This effect of solvent on λ$_{in}$ is not significant for most of the solvents of interest. Second, selective solvation of either products or reactants can affect the ΔG° of the electron-transfer process. Third, the relative stabilization of charge-transfer complex itself can be affected by solvation. In a radical-abstraction process, as suggested for the "homolytic" ISET process in ATRP, there is limited charge buildup in the transition state/donor-acceptor complex, and as the departing halide is captured by the metal center, Cu$^{II}$ in the case of ATRP, selective solvation of the halide is not expected to be significant. However, the selective solvation of Cu$^{II}$ by coordinating solvents such as DMSO could accelerate ATRP in that media. However, in other polar media that does not selectively solvate Cu$^{II}$, increasing the solvent polarity or reaction mixture polarity has resulted in decreased reaction k$_p^{app}$.

SET-LRP is generally conducted in polar solvent mixtures, as they are generally more apt at mediating disproportionation. It has been demonstrated that the addition of H$_2$O to organic solvents results in a linear increase in the k$_p^{app}$ and a general increase in control. Both the increase in rate and improved control may be partially attributable to improved disproportionation of Cu$^I$X in aqueous media. However, it is also evident that the polarity of the solvent itself plays an important role. The transition state in the outer-sphere electron-transfer process of SET-LRP should be a donor-acceptor charge-transfer (CT) complex between the electron donor, Cu$^0$, and electron-acceptor initiator or dormant propagating species. Solvents that stabilize charge-transfer complexes should also enhance the rate of SET-LRP. DMSO is a very polar organic solvent, and it is no coincidence that it is one of the best solvents for SET-mediated organic reactions and for SET-LRP. The Dimroth-Reichardt parameter (E$_T^N$), is a measure of solvent polarity based on the transition energy of CT band of a pyridinium N-phenolate betaine dye. It is evident that there is a very strong correlation between the E$_T^N$ of the solvent and the k$_p^{app}$ of the reaction. Acetone, DMAC, DMSO, NMP, and their binary mixtures with water can all be fit with a single linear regression. However, EC, PC, EtOH, MeOH, and methoxy ethanol are offset from the main-trend line. Later studies concerning binary mixtures of organic solvents show that, in mixtures of EC-DMSO, EC-DMF, EC-DMAC, and DMSO-acetone, the addition of more polar EC or DMSO serves the same role as H$_2$O in enhancing the k$_p^{app}$. For higher proportions of DMSO, DMF, or DMAC, the results fit the trend line observed previously for binary mixtures of organic solvents and H$_2$O. However, when higher proportions of EC are used in these examples or MeOH in other examples, deviations from the main-trend line are observed. This deviation is likely caused by the fact that alcohols and alkyl carbonates do not stabilize colloidal $Cu^0$ while DMAC, DMF, and DMSO do. Thus, the kinetics and control of SET-LRP are cooperatively and synergistically controlled by solvent polarity and its ability to stabilize polar transition states and intermediates, as well as the extent of disproportionation in the solvent/ligand mixtures, and its ability to stabilize colloidal $Cu^0$ and regulate its size distribution.

The rate enhancement afforded by solvents with high Dimroth-Reichardt constants in SET-LRP is likely a combination of its ability to stabilize charge separation in the ET transition state, the cuprous cation, and the halide anion derived via the DET process. Mechanistic studies have suggested a DET mechanism for the oxidative dissolution of $Cu^0$ by benzyl halides in dipolar aprotic media. In their studies, the rate of reaction was not correlated with the Dimroth-Reichardt parameter, though DMSO was still the best solvent. In their case, the $Cu^0 \rightarrow Cu^I$ redox process was occurring without the presence of N-ligand. Thus, they found that specific solvation of in situ generated $Cu^I$ cations with high donor number ($DN_{SbCl5}$) solvents was necessary. In SET-LRP, N-ligands such as $Me_6$-TREN stabilize transient $Cu^I$ and resultant $Cu^{II}$ species, in place of or in conjunction with solvent. Thus, solvent polarity becomes a more prominent effect.

In nontransition-metal catalyzed SET-DTLRP, it was proposed that $SO_2^{\cdot-}$ mediates DET of R—I intermediates. $SO_2^{\cdot-}$ generated via sodium dithionite is well-known for its ability to mediate the perfluoroalkylation or sulfinatodehalogenation of perfluoroalkyl halides via a radical mechanism, presumably through a heterolytic cleavage of perfluoroalkyl halides. Sulfinatodehalogenation mediated by $SO_2^{\cdot-}$ is presumed to proceed through the SET-mediated cleavage of $R_F$—X to $R_F^{\cdot}$ followed by addition of $SO_2/SO_2^{\cdot-}$. While the reaction could conceivably proceed through an $S_N2$ or bromonium abstraction, the presence of $R_F^{\cdot}$ has been shown in the solution via electron spin resonance (ESR) and chemical trapping studies. It is generally believed that this process goes by DET to the σ* orbital followed by heterolytic cleavage. However, J. M. Savéant has noted the significant acceleration of the $SO_2^{\cdot-}$ reduction of $CF_3Br$ versus the corresponding reduction via pure OSET aromatic radical anions in cyclic voltammetry experiments (see *J. Am. Chem. Soc.* 1990, 112, 786). Savéant invoked either an intimate ISET process or Br· abstraction as a cause for the rate enhancement and later dubbed $SO_2^{\cdot-}$ an inner-sphere donor. Savéant also suggested that the complexation of $SO_2$ with $Br^-$ is a driving force for the rate acceleration via an abstraction process. Wakselman has argued against the abstraction mechanism, citing as a chief detractor that, in preparative trifluoromethylations using $SO_2^{\cdot-}$, $SO_2Br^-$ formation was not observed (see *J. Fluorine Chem.* 1992, 59, 367). Regardless of the true nature of the reaction of $SO_2^{\cdot-}$ with $CF_3Br$, any conclusions drawn for perfluoroalkyl halides is unlikely valid in the case of alkyl halides. In the case of perfluoroalkyl halides, the electron-withdrawing power of the fluoride polarizes the C—X bond, placing a partial positive charge on the halide. Through this partial positive charge, perfluoroalkyl and perfluoroaromatic halides can complex with Lewis bases and have been used as receptors in crystal, liquid crystal, and polymer organization. In alkyl halides, the partial charge on the halide is negative, and thus, an encounter complex between R—X and $SO_2^{\cdot-}$ is expected to be less intimate and less likely to involve a halide bridge. Thus, even if an inner-sphere encounter complex may be accessible for $CF_3Br$ and other perfluoroalkyl halides, the same cannot be concluded about alkyl halides. Further, in SET-DTLRP, the prospective electron acceptors are alkyl iodides. $I^-$ and the reaction is conducted in the aqueous media. The enhanced solvation of $I^-$ in aqueous media relative to $Br^-$ in polar organic media of Savéant's study further limits the likelihood of a $SO_2I^-$ adduct via an associative mechanism.

The likelihood of an SET pathway is often bolstered if the reaction is slowed by the presence of an electron-transfer inhibitor such as dinitrobenzene (DNB). In the $Cu^0/Me_6$-TREN catalyzed SET-LRP of MA in toluene/phenol, it was interesting to note that the only phenol additive that did not mediate any polymerization was nitrophenol. Even in the absence of phenol, polymerization proceeded, but with limited conversion and increased polydispersity. While no explanation for the incompatibility of nitrophenol with SET-LRP was given, it is likely that nitrophenol is acting as a competitive electron acceptor. p-Nitrophenol is a potent electron acceptor, with $E°$ (DMSO) (vs SCE) of −1.26. Because of the protic nature of nitrophenol, even in aprotic solvents such as DMSO, it undergoes proton-assisted irreversible reduction to p-nitrosophenol and a variety of other further reduced adducts. As the reduction potential of nitrophenol is lower or on par with the organic halide initiators and dormant species involved in SET-LRP, it stands to reason that it inhibits the SET process through irreversible reduction, thereby consuming the catalyst.

As DET is the likely mechanism of $Cu^0$, $Cu_2X$, and $SO_2^{\cdot-}$ mediated SET-LRP and SET-DTLRP, it is the electron affinity and heterolytic bond dissociation energy that are most relevant to the thermodynamics and kinetics of activation. Accordingly, studies were performed to compute the heterolytic bond dissociation energies (BDEs) of model initiator and dormant halide compounds via DFT (B3LYP) at the 6-31+G* level of theory. The trends in heterolytic BDEs were identical to those of homolytic dissociation energies calculated for ATRP, as it is the relative stability of the resulting radical that varies from structure to structure. With an effective electron donor like $Cu_2X$, $Cu^0$, or $SO_2^{\cdot-}$, a mechanism involving heterolytic dissociation via ET is expected to be more rapid than a mechanism that proceeds mostly through homolysis. Further, DFT of the heterolytic dissociation process suggested the possibility of a stepwise pathway via a radical-anion intermediate. Radical anions as transient intermediates are not unfamiliar in organic reactions. In all cases except for $CH_3CHCl_2$, the computed radical-anion intermediate was lower in energy than the completely dissociated radical and anion. In the first publication of SET-LRP (see Percec et al., *J. Am. Chem. Soc.* 2006, 128, 14156), which contained a more limited set of computations, this radical-anion intermediate was referred to as a "radical-anion cluster", which may be caged with the resulting $Cu^IX/L^+$ salt. However, when the study was expanded to include a greater diversity of initiator and dormant-species model compounds, the intermediate was referred to specifically as a radical anion.

The relative energies of the radical-anion intermediates to the neutral organic halide provide a trend for the electron affinities of the model initiators and dormant halides. In all cases, the electron affinity decreased according to I>Br>Cl. However, the stability of the radical-anion intermediates decreased according to I<Br<Cl. MMA-dormant chains were found to be more effective electron acceptors than MA dormant chains, which were better acceptors than VC or vinyl acetate (VAc) chain ends. Notably, arenesulfonyl halides were found to have the highest electron affinities of all species, which falls in line with their enhanced rate of initiation (vida supra). The variation of heterolytic BDE between organic chlorides, bromides, and iodides was much less significant than differences between the homolytic BDEs. A later study evaluated the thermodynamics of bond dissociation through G3(MP2)-RAD(+) ab initio methods. This higher level of theory study addressed the obvious point that the negative entropy of dissociation, the oxidation potential of the catalyst, and the solvation will somewhat mitigate the benefits of the heterolytic OSET process and perhaps favor a concerted rather than stepwise process where radical anions are at most transient species. Organic halides with high electron affinities are expected to react with $Cu^0$ via an electron-transfer mechanism. The relatively small difference in heterolytic BDEs is corroborated by less than an order of magnitude differences in $k_p^{app}$ for iodo chain ends vs chloro chain ends. These observations are in accord with other outer-sphere heterolytic dissociative electron-transfer processes. These can be contrasted to the difference in $10^3$-$10^4$ differences in $k_{act}$ for ATRP, which bear greater accord with results from reactivity trends in other inner-sphere processes.

Later re-examination of the computational studies on heterolytic BDEs and electron affinities revealed three related oversights: (1) Most but not all stable radical-anion intermediates are somewhat higher in energy than the neutral compound and significantly higher in energy than the dissociated product, as is the case for the decomposition of aryl halides. (2) In most cases, the R—X bond distances found were too long to be considered a radical anion. (3) The only case where the supposed radical-anion intermediate was higher in energy than the dissociated radical and anion was $CH_3CHCl_2$. In this case, the R—X bond distance was much shorter than the other cases and was more consistent with a radical anion.

Savéant also made careful study of the electrode-catalyzed dissociative electron transfer to organic halides largely via cyclic voltammetry and computational modeling, involving the observation of significant accelerations in electron transfer to organic halides bearing strong electron-withdrawing groups, including perfluoroalkyl halides, carbon tetrahalides, haloacetonitriles, and α-haloacyl and related compounds. This rate acceleration has been attributed to the largely Coulombic attraction of relatively electropositive organic radicals, made so via the pendant electron-withdrawing group, and anions. This ion-dipole interaction modulates the activation barrier via a correction to the Marcus-Hush relationship. As the stabilization term is in the quadratic Gibbs free-energy portion of the equation 1 above, very small stabilization energies can have a dramatic effect. Thus, even in polar media that attenuate ion-dipole clustering, the small residual interaction still results in notable rate acceleration. This mechanism of DET has been termed sticky dissociation. It should be noted that, while sticky dissociation has been confirmed experimentally, theoretically according to the Marcus equation, and in gas-phase ab initio studies, similar ab initio studies using continuum dielectric models have routinely failed to find a minimum corresponding to the anion-radical pair. This has been regarded as a failing not of the theory but of the state of solvation modeling in traditional quantum mechanics packages. It should also be noted that, while this form of dissociation does result in an intermediate, bond breaking is concerted with electron transfer.

The effect of sticky dissociation can be best visualized through potential energy profiles. The presence of an ion-dipole in sticky dissociation and the formation of a caged anion-radical pair results in a transition from purely dissociative curve to a Morse potential, lowering the energy of the intersection point (diabatic transition state or intrinsic self-exchange energy for R—X/{R•+X$^-$}). This effect can also be observed in cases where a true radical anion may precede the formation of the anion-radical pair.

More recent studies have presented some new findings (see the above-referenced B. Rosen and V. Percec, "Single-Electron Transfer and Single-Electron Transfer Degenerative Chain Transfer Living Radical Polymerization", *Chem. Rev.* 109, 5069-5119 (2009), the disclosure of which is incorporated herein by reference in its entirety. First, the potential energy profiles in almost all of the SET-LRP relevant compounds investigated (organic halides with electron-withdrawing functionality) were akin to those reported for other systems found to undergo sticky dissociation. Specifically, a minimum was observed at large C—X bond distances corresponding to a Coulombic ion-dipole attraction. An example is shown for MMA-Cl. In these cases, the charge was almost entirely localized on the halide and conversely the spin was largely concentrated on the carbon center. Second, while the electron affinity and stabilization trends from the original study were by and large replicated, some corrections were made as a lower energy minima was found at a different bond distance than what was reported previously. Most notably in the case of the $CH_2Cl_2$ anomaly, a lower energy sticky anion-radical pair was found at larger distance, bringing it in line with the other compounds. However, it is possible that, in the DET of $CH_2Cl_2$, a true radical-anion intermediate may precede the anion-radical pair, providing for a stepwise DET pathway. This intersection of the homolytic and heterolytic dissociation curves allowed for the crude approximation of the intrinsic self-exchange barrier for the organic halides being investigated. The values reported are uncorrected energies calculated at a relatively low level of theory. However, it is not the quantitative nature of this exercise that is important, but rather the implied trends. Specifically, we were interested in what monomers and initiators that have not currently been investigated experimentally might be compatible with SET-LRP. It was found that acrylonitrile, methyl acrylonitrile, styrene, α-methylstyrene, vinyl bromide, vinyl fluoride, vinyl acetate, and 2-chloropropene all have electron affinities and anion-radical pair stabilization energies comparable with monomers already shown to be compatible with SET-LRP. Thus, under suitable conditions, their SET-LRP is expected.

Further, it was found that, while clearly less favored than activation of other organic halides, the activation of certain organic fluorides, such as head-to-head and head-to-tail poly(vinylidene fluoride) (PVDF), may be possible. It has been reported that $CuCl/Me_6$-TREN can mediate the graft polymerization of MMA and oxyethylene acrylate in NMP initiated with poly(vinylidene fluoride). This polymerization was originally reported as an ATRP process. The solvent/ligand combination of NMP and $Me_6$-TREN has been reported to mediate the disproportionation of $Cu^IX$, and thus, an SET-LRP mechanism is more likely. Additionally, the $Cu^0$-wire/$Me_6$-TREN SET-LRP of MA in NMP has been reported. This is supported by the compatibility with near room temperature conditions, despite the homolytically inert C—F bond. Further, the use of $Me_6$-TREN as ligand resulted in a huge rate increase relative to 4,4'-dimethyl-2,2'-dipyridyl (DMDP, a bpy analogue). This can be attributed to faster disproportionation via $Me_6$-TREN providing for a $Cu^0$ rather than a $Cu^I$ catalyzed process more readily than it can be attributed to the enhanced reactivity of $Cu^ICl/Me_6$-TREN versus $Cu^ICl$/DMDP, in direct analogy to the way in which Cu⁰ regardless of ligand choice provides for reactivation of the stable dormant geminal-dihalides in VC polymerization, while Cu$^I$X catalysts uniformly fail. Additionally, it had been concluded that, for all intents and purposes, reaction control was lost in Cu$^I$Cl/Me$_6$-TREN MMA polymerizations relative to Cu$^I$Cl/bpy polymerization. In the Cu$^I$Cl/Me$_6$-TREN catalyzed extension polymerization of MMA initiated with PVDF, switching from a bpy analogue to Me$_6$-TREN as a ligand increased the reaction rate without diminishing the control of molecular weight distribution. In fact, for the reported conversion, the control was better. In a Cu$^I$ mediated activation of PVDF, a Cu$^I$ fluoride complex will result. It is not clear how well this product will mediate deactivation to form the dormant chloride chain end. However, as disproportionation is occurring in Me$_6$-TREN, Cu$^{II}$Cl$_2$/Me$_6$-TREN deactivator is being produced without going through the fluoride complex. Thus, Cu$^I$/Me$_6$-TREN likely provides rate acceleration via enhanced k$_{act}$, while disproportionation provides control, thus SET-LRP.

The invention is further described by the following non-limiting examples.

EXAMPLES

Examples 1-7

The copolymerization of methyl methacrylate (MMA) and acetic acid (AA) in protic media was conducted by SET-LRP using TosCl as radical initiator with different concentration of acrylic acid according to the reaction scheme:

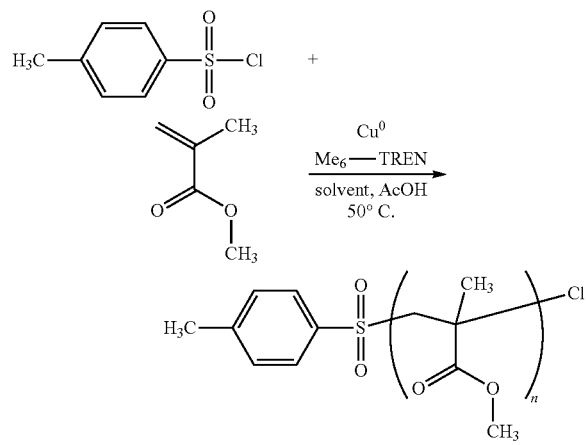

A solution of the monomer (MMA, 1.00 mL, 9.4 mmol), acetic acid (54 µl, 0.94 mmol) solvent (0.50 mL), TosCl (9.0 mg, 0.047 mmol), Cu(0) catalyst (12.5 cm of gauge 20 wire, wrapped around a Teflon-coated stirbar), and ligand (Me$_6$-TREN, 1.3 µl, 0.004 mmol) was prepared and transferred to a 25 mL Schlenk tube. The reaction mixture was thereafter degassed by 6 freeze-pump-thaw cycles and placed in an oil bath thermostated at the desired temperature with stirring. The side arm of the tube was purged with nitrogen before it was opened for samples to be removed at predetermined times, with an airtight syringe. Samples were dissolved in CDCl$_3$, and the conversion was measured by $^1$H NMR spectroscopy. The M$_n$ and M$_w$/M$_n$ values were determined by GPC with PMMA standards. The polymerization mixture was dissolved in 5 mL of CH$_2$Cl$_2$ and passed through a small basic Al$_2$O$_3$ chromatographic column to remove any residual nascent Cu(0) catalyst and Cu(II) deactivator. The resulting solution was precipitated twice in 50 mL methanol with stirring. Methanol was removed by filtration, and the final colorless polymer was dried under vacuum until constant weight was reached.

Cu wire (20 gauge from Fisher), methanol (MeOH), ethanol (EtOH) (Fisher, certified ACS, 99.9%) and acetic acid (98%, Aldrich) were used as received. Tosyl chloride (99%, Aldrich) was recrystallized twice from hexane. Dimethyl sulfoxide (DMSO) (99.9%, Acros) was distilled under reduced pressure prior to use. Methyl methacrylate (MMA) was purchased from Aldrich and passed through basic aluminum oxide in order to remove the inhibitor. Hexamethylated tris(2-aminoethyl)amine (Me$_6$-TREN) was synthesized as described in Inorg. Chem. 1966, 5, 41-44.

500 MHz $^1$H NMR spectra were recorded on a Bruker DRX500 NMR instrument at 20° C. in CDCl$_3$ with tetramethylsilane (TMS) as internal standard. Gel permeation chromatographic (GPC) analysis of the polymer samples were done on a Perkin-Elmer Series 10 high-performance liquid chromatograph, equipped with an LC-100 column over (40° C.), a Nelson Analytical 900 Series integration data station, a Perkin-Elmer 785A UV-vis detector (254 nm), a Varian star 4090 refractive index (RI) detector, and two AM gel (500 Å, 5 µm and 104 Å, 5 µm) columns. THF (Fisher, HPLC grade) was used as eluent at a flow rate of 1 mL/min. The number-average (M$_n$) and weight-average (M$_w$) molecular weights of the PMAMA samples were determined with PMMA standards purchased from American Polymer Standards.

Examples 1-3

Figure 3A:
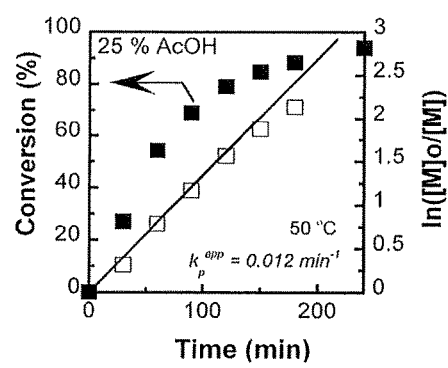
Figure 3B:
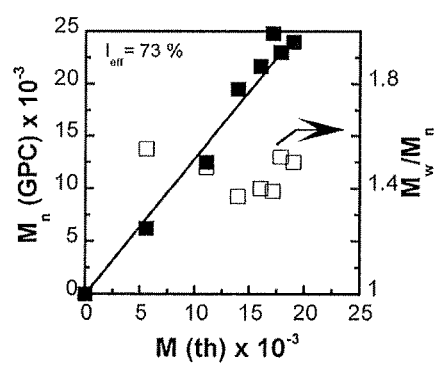

FIGS. 1A-B, 2A-B, and 3A-B depict the results for SET-LRP of 1.00 ml MMA in 0.5 ml methanol/water (95/5) at 50° C. with 1% acetic acid (FIGS. 1A-B), 2.5% acetic acid (FIGS. 2A-B), and 25% acetic acid (FIGS. 3A-B). The ratio of [MMA]$_0$/[TosCL]$_0$/Me$_6$-TREN]$_0$ was 200/1/0.1. Polymerization solutions were prepared and AcOH was added in 2, 5, 20 and 50 equivalents with respect to TosCl (1, 2.5, 10 and 25% monomer concentration). In all of theses cases, very high and even complete conversions were obtained within a few hours reaction time. The polymerization followed straight first order kinetic, and the apparent rate constant of polymerization k$_p^{app}$ somewhat increased with [AcOH]$_0$ and varied from 0.008 to 0.012 min$^{-1}$. It is unclear whether this is a trend since it was found for the SET-LRP of MMA under identical conditions but in absence of acetic acid that k$_p^{app}$=0.010 min$^{-1}$. (see Fleischmann, S. & Percec., V., J. Polym. Sci. Part A: Polym. Chem., 48, 2010, 2236-2242).

Generally, the molecular weight evolution followed the common principles of SET-LRP. The chain growth proceeded linearly with conversion and there was a good agreement between calculated and experimental molecular weight. I$_{eff}$ in the presence of AcOH seems to be significantly increased and values of 70-80% were found. Another fact of the SET-LRP process is that the polydispersity index decreased with conversion and eventually fairly narrow molecular weights distributions are achieved with M$_w$/M$_n$~1.3. In some examples, the two last data points showed an increase of the M$_w$/M$_n$ values. It cannot be ruled out that this is due to the high viscosity of the reaction mixture at this stage. Nonetheless, the experiment with 25% acetic acid especially demonstrates that the SET-LRP process seems to be quite tolerant towards acidic media. FIGS. 1-3 show that the reaction proceeded without induction period and reached a very high conversion (>95%) within 240 min, retaining first order kinetic.

Examples 4-6

Figure 4A:
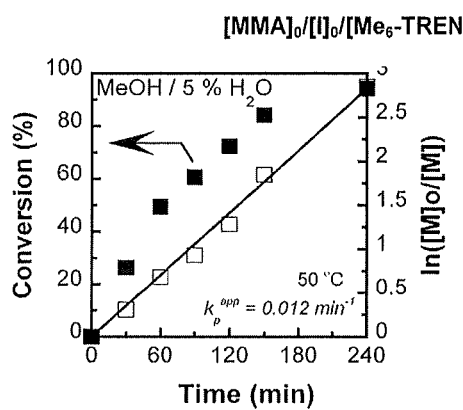
Figure 4B:
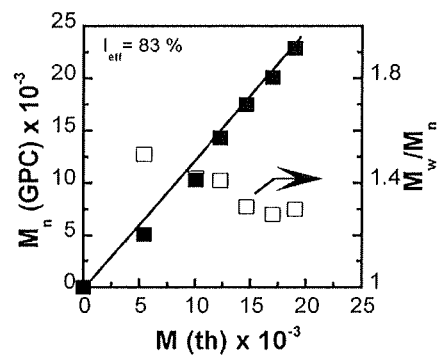
Figure 6A:
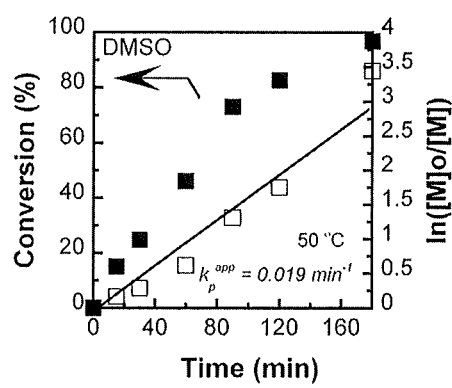
Figure 6B:
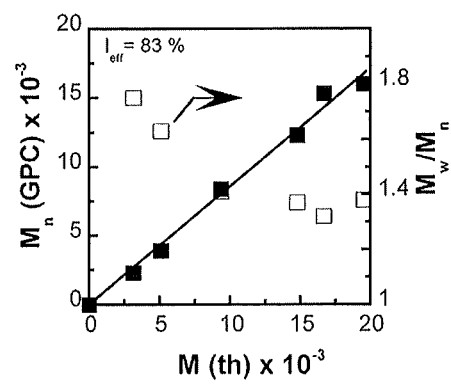

There was also no spectroscopic evidence that AcOH was basically quenched by an in situ esterification with methanol. That is in clear agreement with experiments conducted in other solvent systems. FIGS. 4A-B, 5A-B, and 6A-B depict the results for SET-LRP of 1.00 ml MMA in 0.5 ml different solvents at 50° C. with 10% acetic acid. The solvents were methanol/water (95/5) (FIGS. 4A-B), ethanol/water (95/5) (FIGS. 5A-B), and DMSO (FIGS. 6A-B. The ratio of $[MMA]_0/[TosCL]_0/Me_6\text{-}TREN]_0$ was 200/1/0.1. FIGS. 4-6 show that the SET-LRP of MMA at 50° C. proceeded with 10% acetic acid content in methanol, ethanol, and DMSO. The reaction in DMSO obeyed first order kinetic ($k_p^{app}=0.019$ min$^{-1}$) and complete conversions was reached within 180 min. The molecular weight increased monotonically with conversion and $M_w/M_n$ stayed rather low at 1.3. The comparison in MeOH ($k_p^{app}=0.012$ min$^{-1}$) and EtOH ($k_p^{app}=0.008$ min$^{-1}$) exhibits a difference in rate, a fact that has also been observed in earlier work for the SET-LRP of methyl acrylate in neutral media. In any case, in both situations the control over the molecular weight evolution was high.

Example 7

Figures 7A, 7B:
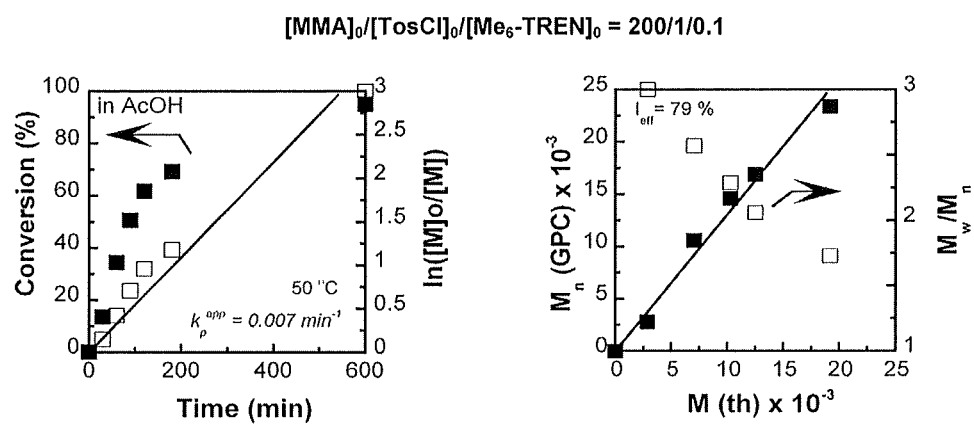

This Example addressed the question of whether SET-LRP can be conducted in acetic acid as solvent. The main points addressed were whether AcOH irreversibly disrupts the Cu(II)/Me$_6$-TREN complex and whether it facilitates the disproportionation of the Cu(I) species. In FIG. 7, the kinetic plot of the SET-LRP of 1.0 ml of MMA in 0.5 ml AcOH at 50° C. is displayed. The ratio of $[MMA]_0/[TosCL]_0/Me_6\text{-}TREN]_0$ was 200/1/0.1. Two aspects became immediately visible. First, the reaction can be driven to completion. This is an important observation because excessive termination would result in an interruption of the polymerization process. Second, the monomer consumption follows first order kinetic so that the overall radical concentration must stay fairly constant.

Examples 8-11

The copolymerization of MMA and methacrylic acid (MAA) in protic media was conducted by SET-LRP using TosCl as radical initiator with different concentration of methacrylic acid according to the reaction scheme:

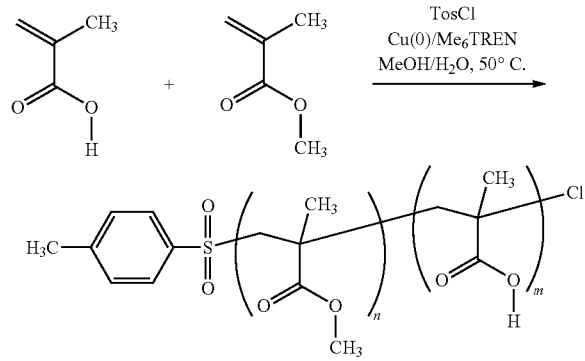

A solution of the MMA (1.00 mL, 9.4 mmol), MAA (80 µl, 0.94 mmol) solvent (0.50 mL), TosCl (9.4 mg, 0.047 mmol), Cu(0) catalyst (12.5 cm of gauge 20 wire, wrapped around a Teflon-coated stirbar), ligand (Me$_6$-TREN, 1.3 µl, 0.004 mmol) and approximately 20 mg dimethylsulfone (as internal standard for quantification of the NMR experiments) was prepared and transferred to a 25 mL Schlenk tube. The reaction mixture was thereafter degassed by 6 freeze-pump-thaw cycles and placed in an oil bath thermostated at the desired temperature with stirring. The side arm of the tube was purged with nitrogen before it was opened for samples to be removed at predetermined times, with an airtight syringe. Samples were dissolved in CDCl$_3$, and the conversion was measured by $^1$H NMR spectroscopy. The $M_n$ and $M_w/M_n$ values were determined by GPC with PMMA standards. The polymerization mixture was dissolved in 2 mL of CH$_2$Cl$_2$ and passed through a small basic Al$_2$O$_3$ chromatographic column to remove any residual nascent Cu(0) catalyst and Cu(II) deactivator. The resulting solution was precipitated twice in 50 mL methanol with stirring. Methanol was removed by filtration, and the final colorless polymer was dried under vacuum until constant weight was reached.

Cu wire (20 gauge from Fisher) and methanol (MeOH), (Fisher, certified ACS, 99.9%) were used as received. Tosyl chloride (99%, Aldrich) was recrystallized twice from hexane. Methyl methacrylate (MMA) and methacrylic acid were purchased from Aldrich and passed through basic aluminum oxide in order to remove the inhibitor. Hexamethylated tris(2-aminoethyl)amine (Me$_6$-TREN) was synthesized as described by M. Ciampolini in Examples 1-7.

500 MHz $^1$H NMR spectra were recorded on a Bruker DRX500 NMR instrument at 20° C. in CDCl$_3$ with tetramethylsilane (TMS) as internal standard. Gel permeation chromatographic (GPC) analysis of the polymer samples were done on a Perkin-Elmer Series 10 high-performance liquid chromatograph, equipped with an LC-100 column over (40° C.), a Nelson Analytical 900 Series integration data station, a Perkin-Elmer 785A UV-vis detector (254 nm), a Varian star 4090 refractive index (RI) detector, and two AM gel (500 Å, 5 µm and 104 Å, 5 µm) columns. THF (Fisher, HPLC grade) was used as eluent at a flow rate of 1 mL/min. The number-average ($M_n$) and weight-average ($M_w$) molecular weights of the PMMA samples were determined with PMMA standards purchased from American Polymer Standards.

Figure 8A:
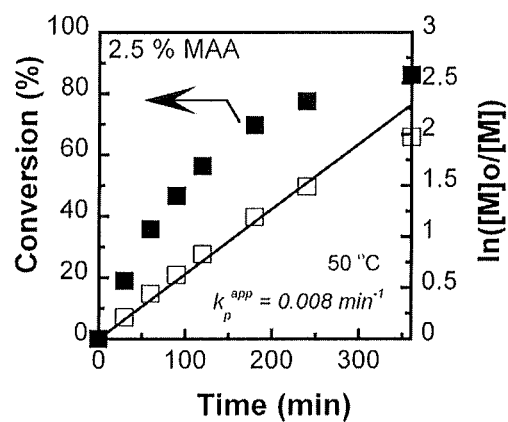
Figure 8B:
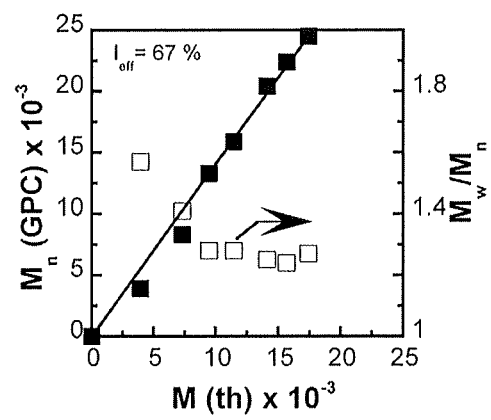

In FIGS. 8A and 8B, the SET-LRP of 1.00 ml MMA with 2.5% MAA in 0.50 ml methanol/water (95:5) at 50° C. is displayed. The ratio of $[MMA]_0/[MAA]_0/TosCL]_0/Me_6\text{-}TREN]_0$ was 200/5/1/0.1. At this very low acidic monomer content the polymerization obeyed first order kinetic ($k_p^{app}=0.008$ min$^{-1}$) and very high conversion was reached after 360 min. The apparent rate constant of propagation $k_p^{app}$ was therefore in the same ranges reported in the literature for the SET-LRP in absence of any acidity ($k_p^{app}=0.010$ min$^{-1}$) or in presence of 2.5% AcOH ($k_p^{app}=0.009$ min$^{-1}$). The molecular weight evolved linearly with conversion with an initiator efficiency of $I_{eff}=67\%$. The low value for $M_w/M_n\sim1.3$ suggests the living nature of the process.

Figure 9A:
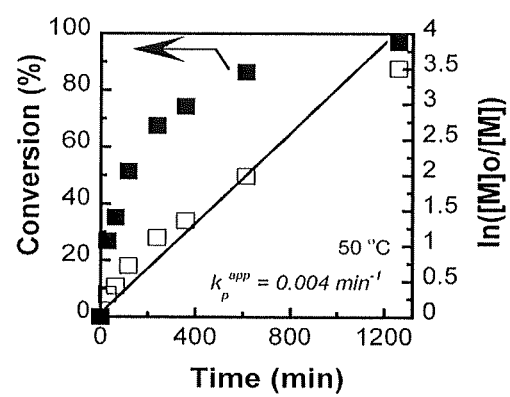
Figure 9B:
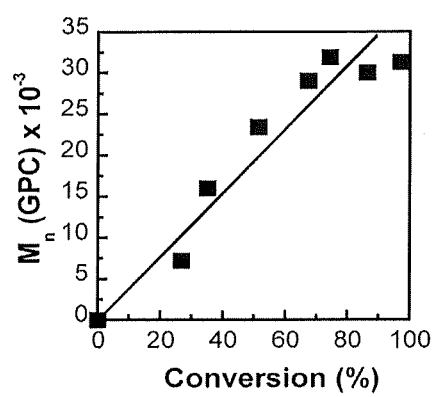
Figure 9C:
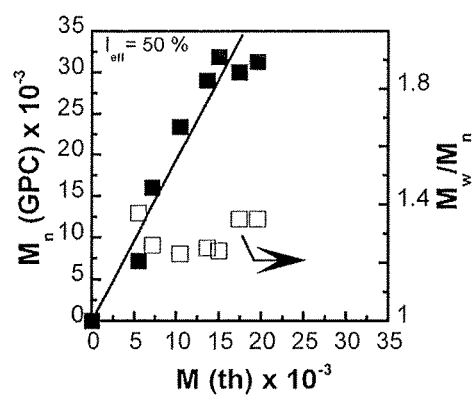
Figure 9D:
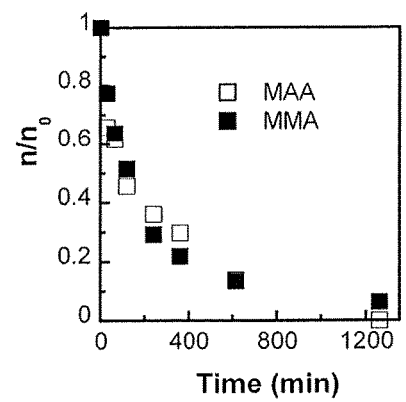

In the next step, the level of MMA was increased and a batch of 1.00 ml MMA containing 10% MAA in 0.50 ml methanol/water (95:5) was polymerized via SET-LRP at 50° C. The ratio of $[MMA]_0/[MAA]_0/TosCL]_0/Me_6\text{-}TREN]_0$ was 200/20/1/0.1. The kinetic plot of such an experiment can be seen in FIG. 9A. The reaction was slower compared to the previous case, but still followed first order kinetic with $k_p^{app}$=0.004 min$^{-1}$. The incorporation of the two monomers into the growing chain occurred simultaneously. As can be seen from FIG. 9D, the decrease of both MMA and MAA occurred almost synchronically. The molecular weight monotonically with the monomer consumption with $I_{eff}$=50% was significantly reduced (FIGS. 9B and 9C). The $M_w/M_n$ values became smaller as the reaction proceeded, however, and increased slightly toward higher conversions. It is not clear whether broadening of the molecular weight distribution has a real physical cause or originates from an artifact by introducing oxygen while sampling. In contrast to that, an experiment where the acidity was further increased by the addition of acetic acid (equimolar to MAA) revealed some interesting trends. The monomer consumption followed the same first order kinetic with $k_p^{app}$=0.006 min$^{-1}$. Also, the molecular weight increases linearly with conversion with $I_{eff}$=58% being just slightly different form the previous case. The $M_w/M_n$ values, in contrast, equilibrated at 1.3 and dramatic increase was observed at the end of the reaction. Clearly, the "extra" acidity via AcOH addition did not further disturb the SET-LRP of MMA but rather enhances the polymerization.

Figure 10A:
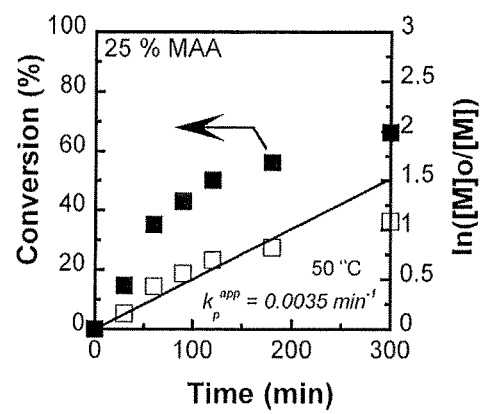
Figure 10B:
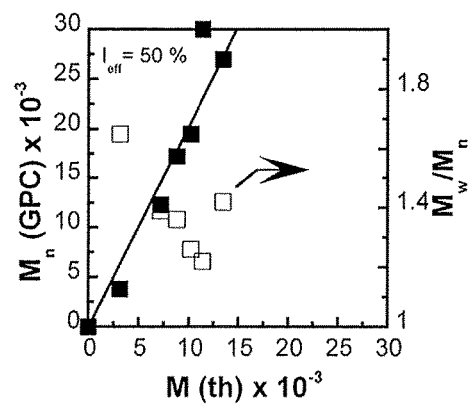
Figure 11A:
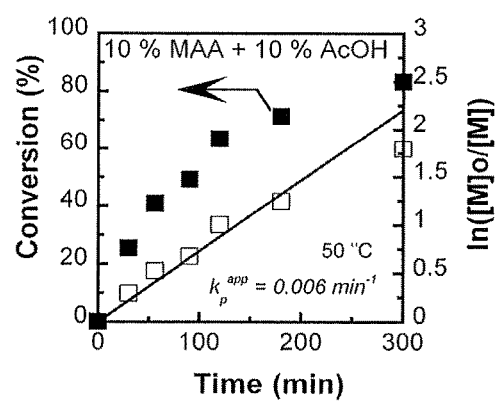
Figure 11B:
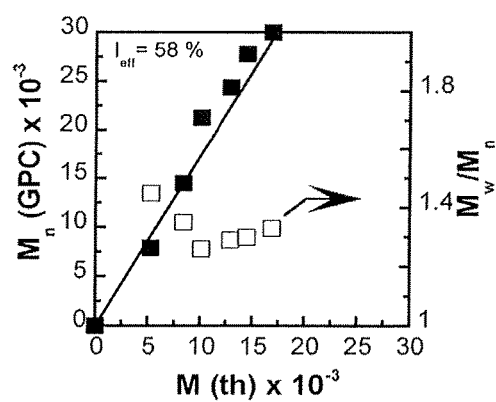

FIGS. 10A-B depict the polymerization of 1.00 ml MMA with 25% MAA in 0.50 ml methanol/water (95/5) at 50° C. ([MMA]$_0$/[MAA]$_0$/TosCL]$_0$/Me$_6$-TREN]$_0$=200/20/1/0.1), and FIGS. 11A-B depict the polymerization of 1.00 ml MMA with 10% MAA and 10% acetic acid in 0.50 ml methanol/water (95/5) at 50° C. ([MMA]$_0$/[MAA]$_0$/TosCL]$_0$/Me$_6$-TREN]$_0$=200/20/1/0.1). The polymerization with 25% MAA resulted in the loss of the 'livingness' as shown in FIGS. 10A and 10B. The reaction followed first order kinetic up to about 50% conversion, and the rate of propagation ($k_p^{app}$=0.0035 min$^{-1}$) in this linear regime was much slower than for the previous experiments. Above this conversion, the rate notably decreased. The molecular weights, however, increased linearly with conversion, so that a certain control over the polymerization was maintained. However, in Example 3, SET-LRP of MMA in the presence of 25% acetic acid under identical conditions the reaction went to completion within 4 hours. Herein, the reaction followed first order kinetic and the molecular weights increased linearly with conversion. For this reason, it is unlikely that the acidity of the reactions mixture yields a disruption of the activator/deactivator complex and is therefore not accountable for the loss of livingness in the process.

An important issue that has to be addressed in this context is the reactivity and nature of the growing macroradical species. It is not just the difference in reactivity of the MMA versus the MAA radical that needs consideration. Buback et al (see *Macromolecules* 2009, 42, 7753-61) have demonstrated that the rate of polymerization of methacrylic acid in free radical polymerization strongly depends on the degree of ionization. More precisely, $k_p$ for nonionized MAA was an order of magnitude higher than for fully ionized MAA. The addition of "extra" acetic acid as shown in FIGS. 11A-B might very well contribute to the polymerization process in such a way that it keeps the growing MAA radical protonated. The degree of ionization of polymeric MAA differs remarkably from the monomer since the pk$_a$ of poly(methacrylic acid) is significantly lower than that for its monomer.

On the other hand, in living radical polymerization where the control is based on balanced rates of activation and deactivation of dormant/active species, significant differences in radical reactivity are decisive. Activation/deactivation in SET-LRP is achieved by heterolytic bond cleavage of a carbon halogen double bond and the reversible atom transfer of a halogenide to a carbon centered radical, respectively. The halogen, in turn, plays a pivotal role in balancing the dormant/active equilibrium and, ultimately, the control of the polymerization process.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method of making an acrylic polymer or copolymer, comprising performing a single-electron transfer living radical polymerization of a reaction mixture comprising:
   (a) one or more acrylic monomers, including a monomer of the formula:

wherein R$_1$ is hydrogen or alkyl and R$_2$ is carboxyl or carboxylate;
   (b) a metal single-electron transfer catalyst;
   (c) a component comprising a solvent and optional sulfide-free ligand, where said component or combination of component and monomer is used to disproportionate the metal single-electron transfer catalyst; and
   (d) an organohalide initiator;
   with the proviso that the solvent includes a compound comprising a carboxyl group.

2. The method of claim 1, wherein the metal single-electron transfer catalyst is Cu(I)X where X is Cl, Br, or I, and the component or combination of component and monomer is capable of disproportionating the metal catalyst Cu(I)X into Cu(0) and Cu(II)X$_2$.

3. The method of claim 2, wherein the component includes a ligand that comprises N-ligand groups.

4. The method of claim 1, wherein the component includes a ligand that comprises N-ligand groups.

5. The method of claim 1, wherein R$_2$ is carboxyl.

* * * * *